(12) United States Patent
Heutchy

(10) Patent No.: US 9,902,388 B2
(45) Date of Patent: Feb. 27, 2018

(54) BRAKE HOSE PROTOTYPE ASSEMBLY AND METHOD FOR PROTOTYPING A BRAKE HOSE ASSEMBLY

(71) Applicant: Toyota Motor Engineering & Manufacturing North America, Inc., Erlanger, KY (US)

(72) Inventor: Andrew W. Heutchy, Ypsilanti, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/600,524

(22) Filed: Jan. 20, 2015

(65) Prior Publication Data

US 2016/0207517 A1    Jul. 21, 2016

(51) Int. Cl.
| | | |
|---|---|---|
| *A62C 13/76* | (2006.01) | |
| *B60T 17/04* | (2006.01) | |
| *B62D 65/02* | (2006.01) | |

(52) U.S. Cl.
CPC .......... *B60T 17/046* (2013.01); *B62D 65/028* (2013.01)

(58) Field of Classification Search
CPC ...... B60T 8/4827; B60T 8/4818; B60T 17/04; F01P 11/04
See application file for complete search history.

(56) References Cited

U.S. PATENT DOCUMENTS

| | | | | |
|---|---|---|---|---|
| 2,272,852 | A |  | 2/1942 | Schaefer |
| 2,449,265 | A | * | 9/1948 | Williams ............... F01P 11/04 138/104 |
| 3,990,671 | A |  | 11/1976 | Seyler |
| 4,922,622 | A | * | 5/1990 | Galloway ............... G01B 3/02 33/542 |
| 5,799,407 | A |  | 9/1998 | Powell |
| 5,865,215 | A | * | 2/1999 | Freed ..................... F16L 11/20 138/109 |

(Continued)

FOREIGN PATENT DOCUMENTS

| | | |
|---|---|---|
| DE | 3246779 A1 | 6/1984 |
| DE | 10024659 B4 | 9/2004 |

(Continued)

*Primary Examiner* — Amy J. Sterling
(74) *Attorney, Agent, or Firm* — Dinsmore & Shohl LLP

(57) ABSTRACT

The device for prototyping a conduit between a first vehicular component and a second vehicular component includes a flexible cylindrical member, a first connector, and a second connector. The flexible cylindrical member has a first end portion and an opposite second end portion. The flexible cylindrical member has a plurality of equally spaced first and second indicia extending longitudinally and circumferentially, respectively, on an outer surface of the cylindrical member. The first connector is fixedly connected to the first end portion of the cylindrical member. The first connector is connected to the first vehicular body component. The second connector connects to the second vehicular body component. The second connector is positioned between a closed position in which the second end portion is releasably connected to the second connector and an open position in which the second end portion is rotatable and linearly displaceable with respect to the second connector.

20 Claims, 8 Drawing Sheets

(56) References Cited

U.S. PATENT DOCUMENTS

| | | | |
|---|---|---|---|
| 6,189,574 B1 | 2/2001 | Iwasaki et al. | |
| 6,247,763 B1 * | 6/2001 | Rehn | B60T 8/4872 138/137 |
| 6,619,331 B1 * | 9/2003 | Suchdev | F01P 11/04 138/109 |
| 8,070,995 B2 * | 12/2011 | Campau | E03C 1/021 138/104 |
| 2008/0005915 A1 | 1/2008 | Jolin et al. | |
| 2012/0009831 A1 * | 1/2012 | Howard | B63H 21/38 440/88 N |

FOREIGN PATENT DOCUMENTS

| | | |
|---|---|---|
| DE | 202008013945 U1 | 1/2009 |
| JP | 10026267 A | 1/1998 |

\* cited by examiner

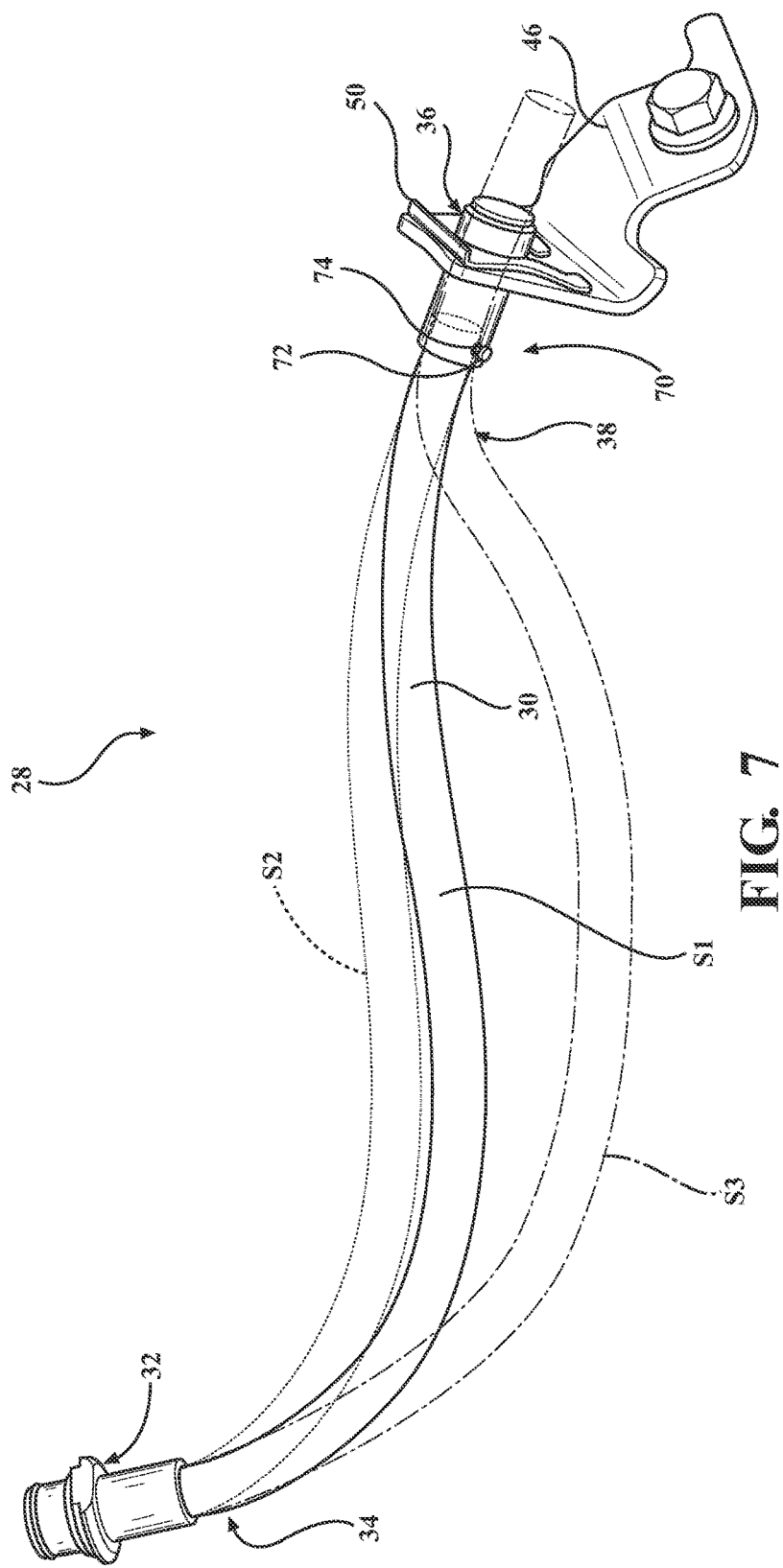

BRAKE HOSE PROTOTYPE ASSEMBLY AND METHOD FOR PROTOTYPING A BRAKE HOSE ASSEMBLY

FIELD OF THE INVENTION

The present invention is directed to a brake hose prototype assembly and method for prototyping a brake hose assembly, more particularly, an assembly and method which allows for linear and rotational displacement of a brake hose relative to a releasable fitting to prototype the length and orientation dimensions for a brake hose assembly.

BACKGROUND OF THE INVENTION

Most modern automotive vehicles undergo an evaluation process during vehicle development. One aspect of the evaluation process is to verify that a brake hose assembly provides the necessary packaging and clearance requirements for being installed into a vehicle. Specifically, that the brake hose is contained within a packaging constraint and maintains a proper clearance distance to surrounding components.

Previously the evaluation of the brake hose assembly was performed by prototyping a plurality of brake hose assemblies each having a brake hose and a fitting fixedly secured to each end of the brake hose. Each of the plurality of brake hose assemblies has at least a difference in fixed length or orientation. The distance of the brake hose between the fittings fixedly secured to either end of the brake hose defines the length. The rotational angle between brake hose and one of the fittings defines an orientation or shape of the brake hose.

In order to evaluate the brake hose assembly for the proper packaging and clearance requirements, one of the plurality of brake hose assemblies is installed onto the vehicle. The vehicle undergoes an evaluation to subject the vehicle to a full range of motion. The full range of motion includes a full depression and release of a suspension apparatus and full steering of the wheel.

If the installed brake hose fails to provide the proper packaging and clearance requirements, the installed brake hose assembly is removed. A new brake hose assembly having a different fixed length or different fixed orientation is installed onto the vehicle. Upon installation of the new brake hose assembly, the evaluation process is repeated.

The process of removing the previous brake hose assembly, installing of a new brake hose assembly having a different dimensions, and evaluating the new brake hose assembly is repeated over and over again until a suitable brake hose assembly is discovered. The suitable brake hose assembly is then measured to determine the length and angle, and manufacturing of production brake hose assemblies to be installed into a completed vehicle is commenced.

In some situations, none of the prototyped brake hose assemblies meets the packaging and clearance requirements. Therefore, an entire new set of brake hose assemblies having different variations of the fixed length and fixed angled orientation must be prototyped. The evaluation of the brake hose assembly is delayed until the new set of brake hose assemblies is constructed. Once the construction of the new set of brake hose assemblies is complete, the installation, evaluation and removal process begins again.

As such, the evaluation of the brake hose assembly is a time consuming process due to the repeated installation and removal of a number of different brake hose assemblies. In addition, the evaluation requires the construction of a number of different brake hose assemblies each having an individual variation in at least length and angled orientation. Therefore, the evaluation process results in an increase in manufacturing expenses, due to the number of brake hose assemblies required to be prototyped. The evaluation process further results in a decrease in efficiency as the time required to evaluate the brake hose assembly is increased due to the repeated installation, evaluation and removal of various brake hose assemblies. Consequently, the overall vehicle evaluation expense is increased due to the increased number of parts and increased time to evaluate the vehicle.

Thus, there exists a need in the art to improve the previously known brake hose assembly prototyping and method thereof so as to reduce the number of brake hose assemblies constructed and the time to complete of the vehicle evaluation.

SUMMARY OF THE INVENTION

The present invention provides an improved device for prototyping a conduit between a first vehicular component and a second vehicular component which overcomes the above mentioned disadvantages of the previously known prototype assemblies which lack adjustability in length and orientation.

In brief, the device for prototyping a conduit between a first vehicular component and a second vehicular component includes a flexible cylindrical member, a first connector, and a second connector. The flexible cylindrical member has a first end portion and an opposite second end portion. The flexible cylindrical member has a plurality of equally spaced first indicia extending longitudinally on an outer surface of the cylindrical member. The flexible cylindrical member has a plurality of equally spaced second indicia extending circumferentially on the outer surface of the cylindrical member.

The first connector is fixedly connected to the first end portion of the cylindrical member. The first connector is connected to the first vehicular body component.

The second connector connects to the second vehicular body component. The second connector is positioned between a closed position in which the second end portion is releasably connected to the second connector and an open position in which the second end portion is rotatable and linearly displaceable with respect to the second connector.

The second connector optionally includes a securement member that positions the second connector in the closed position or the open position. The securement member frictionally engages the flexible cylindrical member to the second connector in the closed position to prevent relative movement between the flexible cylindrical member and the second connector.

The second connector optionally includes a securement member that positions the second connector in the closed position or the open position. The securement member pierces the outer surface of the flexible cylindrical member in the closed position to prevent relative movement between the flexible cylindrical member and the second connector.

The device further includes a third connector positioned on the flexible cylindrical member between the first connector and the second connector.

The third connector is optionally fixedly connected to the flexible cylindrical member between the first end portion and the second end portion. In the alternative, the third connector is positioned between a closed position in which a portion of the flexible cylindrical member is releasably connected to the third connector and an open position in which the flexible cylindrical member is rotatably and linearly displaceable with respect to the third connector.

A method for prototyping a brake hose assembly to determine a length of a brake hose between a first vehicular body component and a second vehicular body component and to determine an orientation of the brake hose relative to the second vehicular body component is provided. The method includes the steps of providing a brake hose assembly.

A method for prototyping a brake hose assembly to determine a length of a brake hose between a first vehicular body component and a second vehicular body component, and adapted for determining an orientation of the brake hose relative to the second vehicular body component. The brake hose assembly having: a flexible cylindrical member, a first connector, and a second connector. The flexible cylindrical member has a first end portion and an opposite second end portion. The flexible cylindrical member has a plurality of equally spaced first indicia extending longitudinally on an outer surface of the cylindrical member. The flexible cylindrical member has a plurality of equally spaced second indicia extending circumferentially on the outer surface of the cylindrical member.

The first connector is fixedly connected to the first end portion of the cylindrical member. The first connector is connected to the first vehicular body component.

The second connector connects to the second vehicular body component. The second connector is positioned between a closed position in which the second end portion is releasably connected to the second connector and an open position in which the second end portion is rotatable and linearly displaceable with respect to the second connector.

The method includes the steps of connecting the first connector to the first vehicular body component; connecting the second connector to the second vehicular body component; moving the second connector from the closed position to the open position; manipulating the second end portion of the flexible cylindrical member to displace the flexible cylindrical member at least linearly or rotationally with respect to the second connector and identifying one of the plurality of first indicia corresponding to a length of the flexible cylindrical member between the first vehicular body component and the second vehicular body component or identifying one of the plurality of second indicia corresponding to an angle of the flexible cylindrical member with respect to the second connector.

BRIEF DESCRIPTION OF THE DRAWINGS

A better understanding of the present invention will be had upon reference to the following detailed description when read in conjunction with the accompanying drawings wherein like reference characters refer to like parts throughout the several views and in which:

FIG. 7 is a perspective view of a brake hose assembly illustrating changes in orientation of the brake hose due to a variation in the angle between the brake hose and the releasable connector;

DETAILED DESCRIPTION OF THE INVENTION

The present invention has utility as a device for prototyping a brake hose assembly that is able to vary a length and orientation of a brake hose. Specifically, the brake hose assembly includes a flexible cylindrical member, a first connector, and a releasable second connector. The flexible cylindrical member has a first end portion and an opposite second end portion. The first connector is fixedly secured to the first end portion of the cylindrical member, and the second connector is releasably connected to the flexible cylindrical member.

By providing a releasable connection between the second connector and the flexible cylindrical member allows for the second end portion to be linearly and rotatably displaceable with respect to the second connector. The linear displacement allows for a variation in distance of the flexible cylindrical member between the first connector and the second connector to define a length dimension of the flexible cylindrical member. The rotational displacement allows for a variation in an angle of the flexible cylindrical member with respect to the second connector which defines the shape or orientation off the flexible cylindrical member.

The displacement of the flexible cylindrical member allows for an assembly team member to install a single brake hose prototype assembly. The single brake hose assembly is then evaluated. If the packaging and clearance requirements are not meet, the flexible cylindrical member can be linearly and rotatably displaced to change a length or orientation of the brake hose assembly without removing or installing additional brake hose assemblies. As such, the length and orientation dimensions of the flexible cylindrical member can be determined without the repeated removal and installation of various brake hose assemblies which results in a significant reduction in evaluation time and the number of parts required to be constructed to perform the evaluation.

Specifically, the flexible cylindrical member is provided with a plurality of equally spaced first indicia and a plurality of equally spaced second indicia. The plurality of equally spaced first indicia extends longitudinally on an outer surface of the flexible cylindrical member. The plurality of equally spaced second indicia extends circumferentially on the outer surface of the cylindrical member.

As such, a length of the flexible cylindrical member between the first connector and the second connector is easily identifiable with reference to the plurality of equally spaced first indicia. Similarly, an angle between the flexible cylindrical member and the second connector can be easily identifiable with reference to the plurality of equally spaced second indicia. Therefore, the length and orientation of the brake hose assembly that provides the proper packaging and clearance requirements is determinable upon the installation of only a single brake hose prototype.

Figure 1:
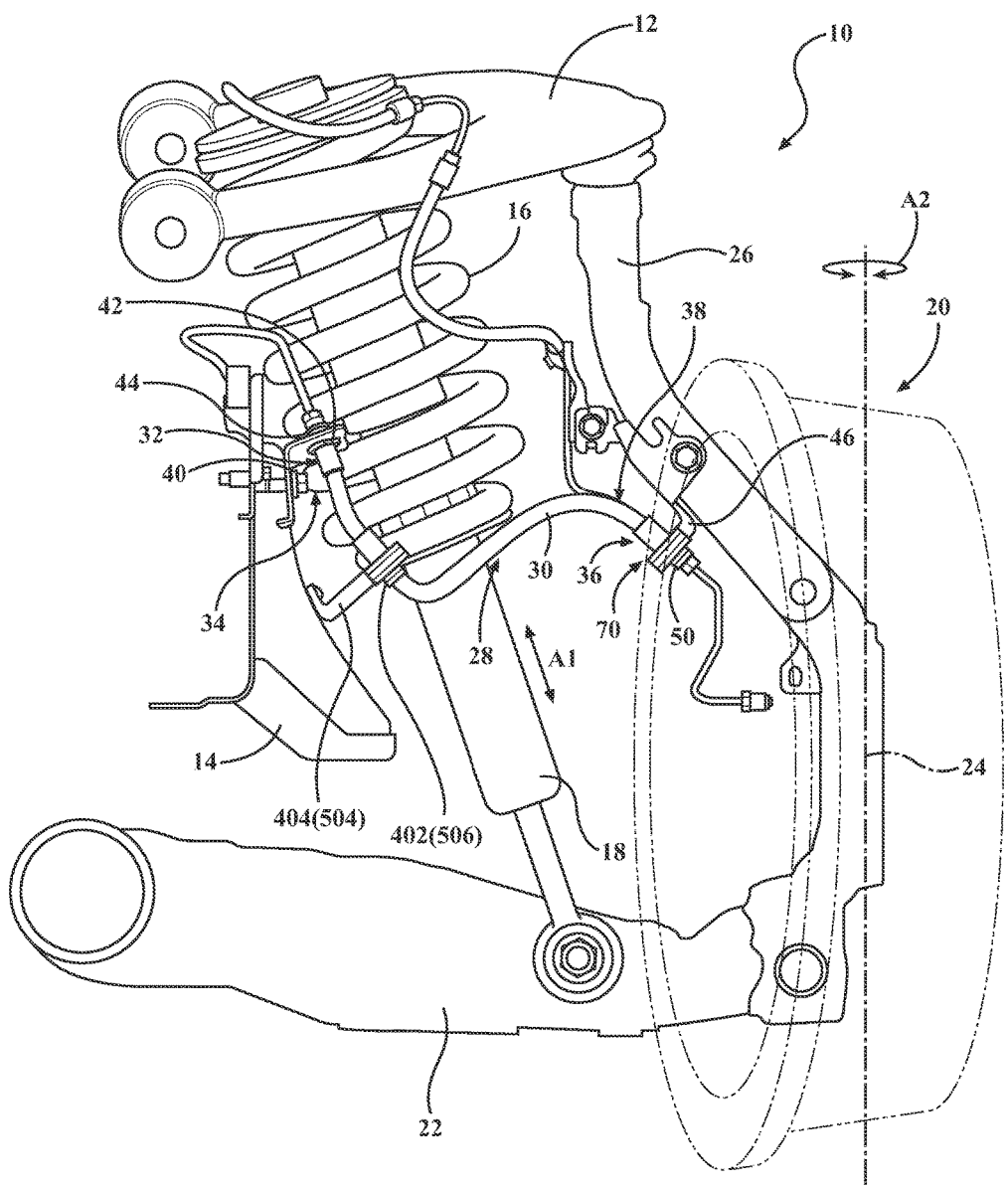
FIG. 1 is a side view of a wheel suspension apparatus of an automotive vehicle.

As illustrated in FIG. 1, a suspension apparatus for a vehicle is generally illustrated at 10. The suspension apparatus includes an upper control arm 12 pivotally mounted to a vehicle chassis 14. A coil spring 16 and a damper 18 form a suspension for a wheel 20. Specifically, the damper 18 is pivotally attached to a control arm 22. One end of the control arm 22 is attached to a wheel hub 24 of the wheel, and an opposite end is pivotally attached the vehicle chassis 14. The connection of the control arm 22 to the chassis 14 through the coil spring 16 and damper 18 allows for the damping of suspension apparatus 10 in the direction of arrow A1.

The wheel hub 24 of the wheel 20 is pivotally connected to the upper control arm 12 by a steering knuckle 26. The steering knuckle 26 allows for steering (turning) of the wheel 20 about an axis A2. As such, in order to provide a sufficient connection between a brake device (not shown) on the wheel hub 24 to a brake actuator and master cylinder (not shown) provided on the vehicle chassis 14, a brake hose assembly 28 is required.

As the wheel 20 will be displaced over a range of motion due to the suspension apparatus 10 displacement in the direction indicated by arrow A1 and about the axis A2, a rigid connection is impractical. The brake hose assembly 28 provides a connection between the wheel hub 24 and the chassis 14 that can absorb the relative motion of the wheel 20 during linear suspension movement and rotational steering of the wheel 20 over a full range of linear and pivotal displacement.

The brake hose assembly 28 includes a flexible cylindrical member 30, a first connector 32 attached to a first end portion 34 of the flexible cylindrical member 30, and a second connector 36 that is attached to a second end portion 38 of the flexible cylindrical member 30. The first connector 32 is fixedly secured to the first end portion 34 of the flexible cylindrical member 30. As will be described in greater detail below, the second connector 36 is releasably connected to the second end portion 38 of the flexible cylindrical member 30.

Figure 2:
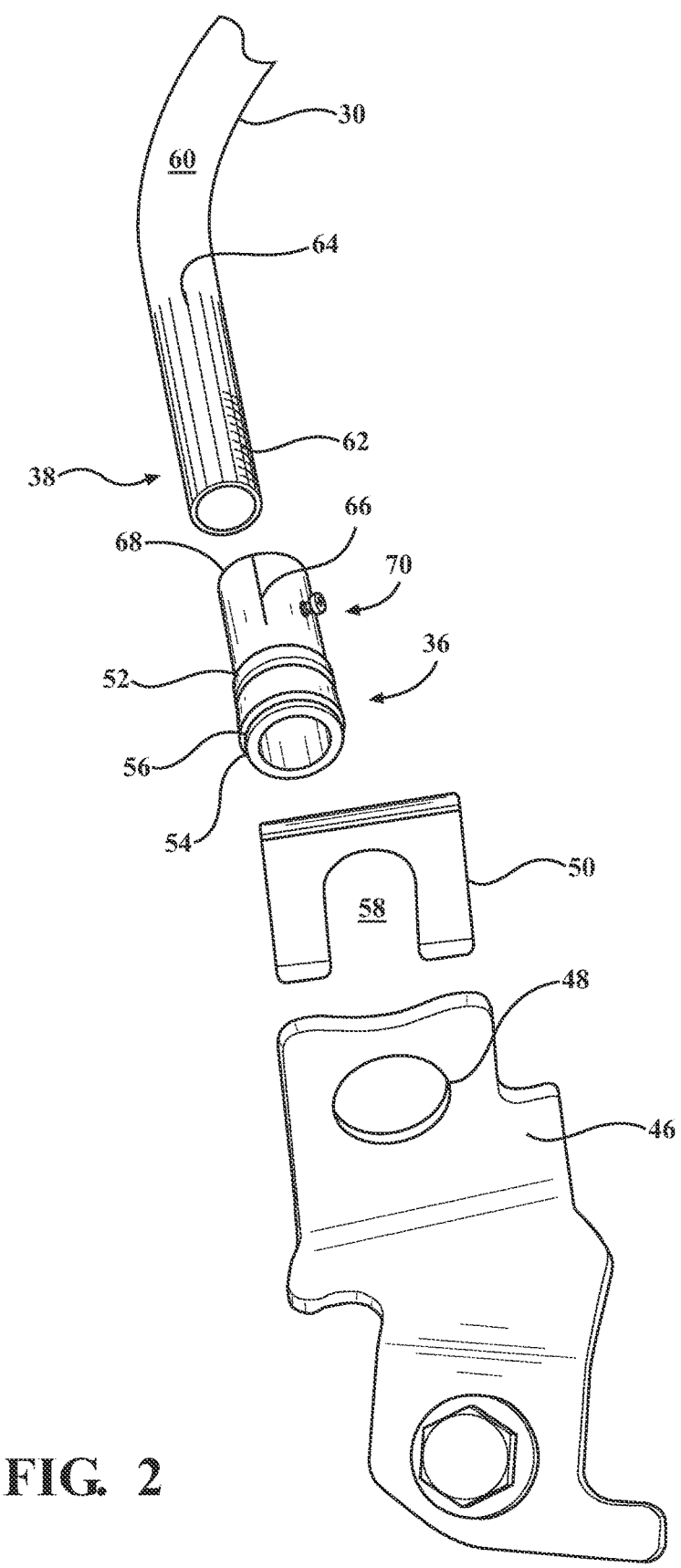
FIG. 2 is a partial exploded perspective view of the brake hose assembly.

As seen in FIGS. 1 and 2, the first connector 32 is secured to a first bracket 40 that is secured to the chassis 14. The first bracket 40 includes an aperture 42 through which the first connector 32 is received. A clip 44 then secures the first connector 32 to the first bracket 40.

Attached to the steering knuckle 26 for the wheel hub 24 is a second bracket 46. The second bracket 46 includes a second aperture 48 through which the second connector 36 is received. A second clip 50 secures the second connector 36 to the second bracket 46.

The second connector 36 has a flange 52 spaced apart from a distal end 54. The flange 52 has a diameter greater than a diameter of the aperture 48. The second connector 36 has a groove 56 positioned between the flange 52 and the distal end 54. The groove 56 has a diameter that is smaller than the diameter of the aperture 48. The second clip 50 has a slot 58 that corresponds to the diameter of the groove 56. It is appreciated, of course, that the aperture 48 and the distal end 54 of the second connector 36 are formed in corresponding non-symmetric shapes, illustratively including rectangles, triangles, hexagon or other regular non-symmetric geometric shapes, to prevent relative rotation between the second connector 36 and the second bracket 46. The first connector 32 and the aperture 42 of the first bracket 40 are similarly shaped.

During installation, the second connector 36 is inserted into the second aperture 48 until the flange 52 abuts the second bracket 46. The groove 56 is positioned on an opposite side of the second bracket 46 from the flange 52. Then the clip 50, specifically, the slot 58 engages with the groove 56 on the side of the second bracket 46 opposite the flange 52. Therefore, the second connector 36 is retained within the second aperture 48 of the second bracket 46 due to the abutment of the flange 52 on one side of the second bracket 46 and the clip 50 engaged within the groove 56 on the opposite side of the second bracket 46.

The connection of the first connector 32 with the aperture 42 of the first bracket 40 through the clip 44 is the same as the second connector 36.

As such, a flexible connection is provided between the chassis 14 and the wheel hub 24 for the steering knuckle 26 to allow for the displacement of the wheel 20 in the shock absorption direction A1 and the steering of the wheel 20 in direction A2.

It is appreciated, of course, that the connection of the first connector 32 and the second connector 36 are not limited to the chassis 14 and the steering knuckle 26 through the first bracket 40 and the second bracket 46, respectively. The first connector 32 is optionally secured to steering knuckle 26 or any other vehicle body component. The second connector 36 is optionally secured to the chassis 14 or any other vehicle body component.

The second connector 36 is selectively positionable between a closed position and an open position. In the closed position the second connector 36 prevents relative movement of the flexible cylindrical member 30 with respect to the second connector 36. In the open position the flexible cylindrical member 30 is rotatably and linearly displaceable with respect to the second connector 36. The second connector 36 is selectively positionable between the open and closed positions even when secured to the second bracket 46. This allows for the variation in length and angle without need for disconnecting the second connector 36 from the second bracket 46.

In the open position the second connector 36 allows for the flexible cylindrical member 30 to slide and rotate with respect to the second connector 36. The linear displacement of the flexible cylindrical member 30 allows for the variation in the length of the flexible cylindrical member 30 between the first connector 32 and the second connector 36. The rotational displacement allows for the variation in the angle between the flexible cylindrical member 30 and the second connector 36.

By varying the angle between the flexible cylindrical member 30 and the second connector 36, the overall shape or orientation of the flexible cylindrical member 30 is variable. Specifically, the variation in the angle allows for a variation in the orientation of the flexible cylindrical member 30 between the first connector 32 and the second connector 36. Varying the angle changes the orientation or shape of the flexible cylindrical member 30 to meet the packaging and clearance requirements due to the change in shape of the flexible cylindrical member 30.

As seen in FIG. 2, an outer surface 60 of the flexible cylindrical member 30 is provided with a plurality of equally spaced first indicia 62. The plurality of equally spaced first indicia 62 extend longitudinally in a first direction on the outer surface 60 of the flexible cylindrical member 30. Each of the plurality of equally spaced first indicia 62 corresponds to a length measurement from the first connector 32.

The flexible cylindrical member 30 is also provided with a plurality of equally spaced second indicia 64 that extend circumferentially in a second direction on the outer surface 60 of the flexible cylindrical member 30. The plurality of equally spaced second indicia 64 are used with a datum 66 provided on the second connector 36 to identify an angled of the flexible cylindrical member 30 with respect to the second connector 36. Each of the plurality of equally spaced second indicia 64 corresponds to an angle measurement of the flexible cylindrical member 30. As the plurality of equally spaced first indicia 62 corresponds to a length measurement from the first connector 32 and the plurality of equally spaced second indicia 64 corresponds to an angle measurement of the flexible member 30, the first direction extends generally normal to the second direction.

The plurality of equally spaced first indicia 62 and the plurality of equally spaced second indicia 64 are provided on the entire outer surface 60 of the flexible cylindrical member 30 between the first end portion 34 and the second end portion 38. Alternatively, the plurality of equally spaced first indicia 62 and the plurality of equally spaced second indicia 64 are provided on a portion of the outer surface 60 of the flexible cylindrical member 30 adjacent the second end portion 38.

Once the second connector is in the closed position, the length and angle dimensions can be determined. Specifically, using the plurality of equally spaced first indicia 62, a length of the flexible cylindrical member 30 from the first connector 32 to an edge 68 of the second connector 36 can be determined. Similarly, using the plurality of equally spaced second indicia 64 and the datum 66, an angle of the flexible cylindrical member 30 with respect to the second connector 36 can be determined.

The second connector 36 includes a securement member 70. The securement member 70 is operable to position the second connector 36 between the open position and the closed position. In the open position the securement member 70 is spaced apart from the flexible cylindrical member 30. As such, the flexible cylindrical member 30 is linearly and rotatably displaceable with respect to the second connector 36. In the closed position the securement member 70 is moved into engagement with the flexible cylindrical member 30 to prevent relative movement between the flexible cylindrical member 30 and the second connector 36.

The securement member 70 is designed to abuttingly contact, in the closed position, the outer surface 60 of the flexible cylindrical member 30 to prevent relative movement of the flexible cylindrical member 30 with respect to the second connector 36. Specifically, in the closed position the securement member 70 is in abutting contact with the outer surface 60 of the flexible cylindrical member 30. The abutting contact between provides a frictional engagement that prevents relative movement of the flexible cylindrical member 30 with respect to the second connector 36.

Figure 3A:
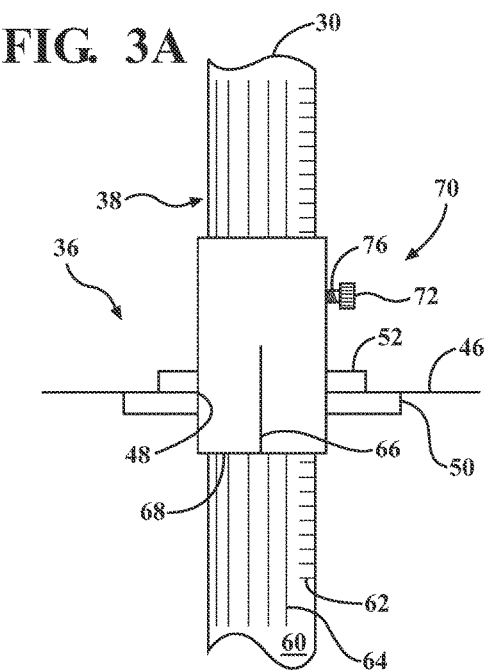
FIG. 3A is a partial side view of the brake hose assembly having an alternative securement member.

As illustrated in FIG. 3A, the securement member 70 is formed as a threaded fastener 72 and an aperture 74 formed in the second connector 36. The second connector 36 is formed as a circular collar or sheave. The fastener 72 is provided with external threads 76 that engage with inner threads 78 formed in the aperture 74.

In the open position, a contact end 80 of the fastener 74 is spaced apart from the outer surface 60 of the flexible cylindrical member 30. In the closed position, the fastener 72 is inserted into the aperture 74 with the external threads 76 engaged with internal threads 78. The fastener 72 is rotated until the contact end 80 is in abutting contact with the outer surface 60 of the flexible cylindrical member 30.

Figure 3B:
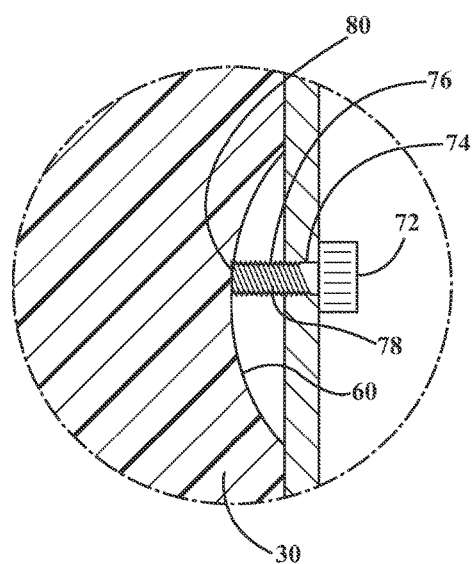
FIG. 3B is an enlarged cross-sectional view of the brake hose assembly having an alternative securement member.

As seen in the enlarged portion of FIG. 3B, the contact end 80 pushes against the outer surface 60 to provide a frictional engagement therebetween to prevent relative movement of the flexible cylindrical member 30 with respect to the second connector 36.

Figure 4A:
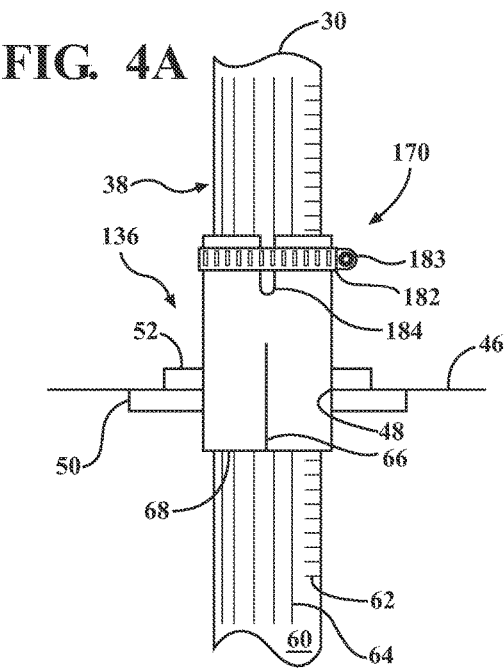
FIG. 4A is a partial side view illustrating the brake hose assembly having a second alternative securement member.

FIG. 4A illustrates a modified securement member 170 in the form of a clamp 182 having a fastener 183 and a second connector 136 formed as a collar or sheave having a slot 184 that at least partially bisects the second connector 136. The clamp 182 extends around the circumference of the second connector 136. By rotating the fastener 183, the diameter of the clamp 182 is circumferentially restricted or loosened. The securement member 170 is designed to abuttingly contact, in the closed position, the outer surface 60 of the flexible cylindrical member 30 to prevent relative movement of the flexible cylindrical member 30 with respect to the second connector 136.

In the open position, the clamp 182 is loose around an exterior of the second connector 136 with an inner surface 186 of the second connector 136 spaced apart from the outer surface 60 of the flexible cylindrical member 30. In the closed position, the clamp 182 is tightened such that the second connector 136 adjacent the slot 184 deforms. The clamp 182 is tightened until the inner surface 186 of the second connector 136 is in abutting contact with the outer surface 60 of the flexible cylindrical member 30.

Figure 4B:
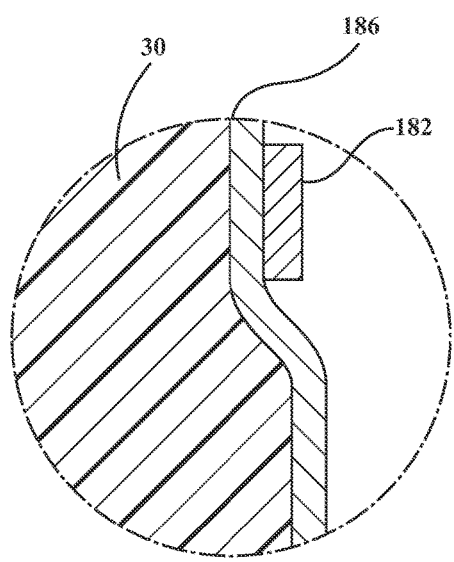
FIG. 4B is an enlarged cross-sectional view of the brake hose assembly having a second alternative securement member.

As seen in the enlarged portion of FIG. 4B, the clamp 182 tightens to circumferentially constrict the outer surface 60 to provide a frictional engagement therebetween to prevent relative movement of the flexible cylindrical member 30 with respect to the second connector 136. The slot 184 allows for the localized deformation of the second connector 136.

Figure 5A:
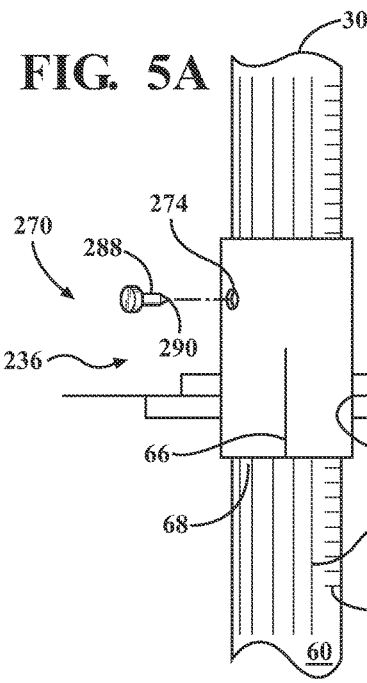
FIG. 5A is a partial side view illustrating the brake hose assembly having a third alternative securement member.

FIG. 5A illustrates an alternative securement member 270. The alternative securement member 270 is in the form of a pin 288 and a second connector 236 having an aperture 274. The second connector 136 is in the form of a collar or sheave. The securement member 270 is designed to abuttingly contact, in the closed position, the outer surface 60 of the flexible cylindrical member 30 to prevent relative movement of the flexible cylindrical member 30 with respect to the second connector 236. Specifically, the securement member 270 pierces the outer surface 60 of the flexible cylindrical member 30, in the closed position, to retain the flexible cylindrical member to the second connector 236.

In the open position, a tip 290 of the pin 288 of the fastener 74 is spaced apart from the outer surface 60 of the flexible cylindrical member 30. In the closed position, the pin 288 is inserted into the aperture 274 and pierces the outer surface 60 of the flexible cylindrical member 30. The pin 288 is inserted into the aperture 274 until the pin 288 is in abutting contact with the outer surface 60 of the flexible cylindrical member 30.

Figure 5B:
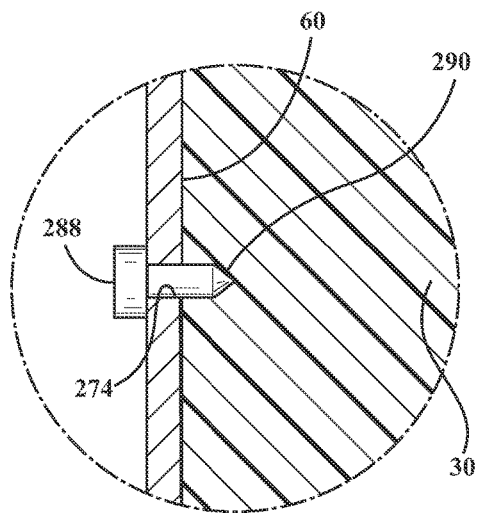
FIG. 5B is an enlarged cross-sectional view of the brake hose assembly having a third alternative securement member.

As seen in the enlarged portion of FIG. 5B, the pin 288 pushes against the outer surface 60 to provide a frictional engagement therebetween to prevent relative movement of the flexible cylindrical member 30 with respect to the second connector 236. Specifically, the tip 290 of the pin 288 is inserted into the flexible cylindrical member 30 such that the tip 290 is below the outer surface 60 of the flexible cylindrical member 30. By piercing the outer surface 60 such that the tip 290 is below the outer surface 60, the securement member 270 provide a frictional engagement therebetween to prevent relative movement of the flexible cylindrical member 30 with respect to the second connector 236.

Figure 6A:
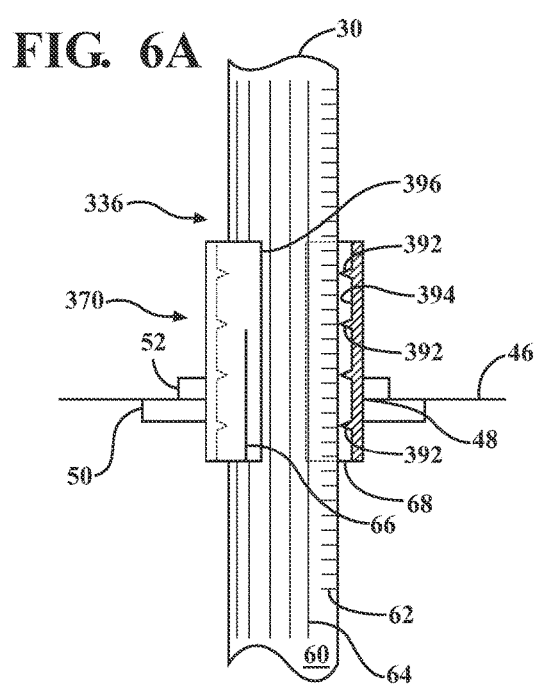
FIG. 6A is a partial side view illustrating the brake hose assembly having a fourth alternative securement member.

FIG. 6A illustrates a modified securement member 370 in the form of a plurality of teeth 392 extending inwardly from an inner surface 394 a second connector 336. The second connector 336 is formed as a collar or sheave having a slot 396 that at least partially bisects the second connector 336. The securement member 370 is designed to abuttingly contact, in the closed position, the outer surface 60 of the flexible cylindrical member 30 to prevent relative movement of the flexible cylindrical member 30 with respect to the second connector 336. Specifically, the securement member 370 pierces the outer surface 60 of the flexible cylindrical member 30, in the closed position, to retain the flexible cylindrical member to the second connector 336.

In the open position, the second connector 336 is loose around the outer surface 60 of the flexible cylindrical member 30. Specifically, the plurality of teeth 392 extending from the inner surface 394 of the second connector 336 are spaced apart from the outer surface 60 of the flexible cylindrical member 30. In the closed position, the second connector 336 is circumferentially constricted to deform radially inward until the plurality of teeth 392 are in abutting contact with the outer surface 60 of the flexible cylindrical member 30.

Figure 6B:
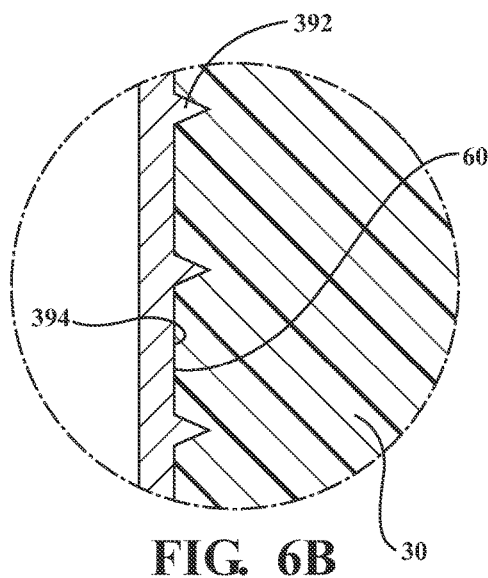
FIG. 6B is an enlarged cross-sectional view of the brake hose assembly having a fourth alternative securement member.

As seen in the enlarged portion of FIG. 6B, the plurality of teeth 392 pushes against the outer surface 60 to provide a frictional engagement therebetween to prevent relative movement of the flexible cylindrical member 30 with respect to the second connector 336. Specifically, the plurality of teeth 392 are inserted into the flexible cylindrical member 30 such that the plurality of teeth 392 are below the outer surface 60 of the flexible cylindrical member 30. By piercing the outer surface 60 such that the plurality of teeth 392 are below the outer surface 60, the securement member 370 provide a frictional engagement therebetween to prevent relative movement of the flexible cylindrical member 30 with respect to the second connector 336.

As the brake hose assembly 28 is a prototype used to merely determine the length and angle dimensions necessary for meeting the packaging and clearance requirements, the piercing of the flexible cylindrical member 30 by securement members 270 and 370 do not affect braking operations. Rather, as the brake hose assembly 28 is only used for prototyping the dimensions, braking operations will not be carried out and the piercing of the flexible cylindrical member 30 will not leak any fluid.

Further, as the brake hose assembly 28 is a prototype, the flexible cylindrical member 30 is optionally a tube, a hose, a solid cylindrical member, or a cylindrical member having a discontinuously hollow interior that would prevent the flow of a fluid.

As shown in FIG. 7, by manipulating the flexible cylindrical member 30 linearly and rotatably with respect to the second connector 36, various shapes of the flexible cylindrical member 30 can be provided so as to meet the required packaging and clearance requirements. Specifically, shape S1 shows a shape of the flexible cylindrical member 30 prior to manipulation. By linearly displacing the flexible cylindrical member 30, shortens the length of the flexible cylindrical member 30 between the first connector 32 and the second connector 36, as shown by dotted shape line S2.

Further, by rotationally displacing the flexible cylindrical member 30, varies the angle of the flexible cylindrical member 30 with respect to the second connector 36, as shown by dotted dashed shape line S3.

Figure 8A:
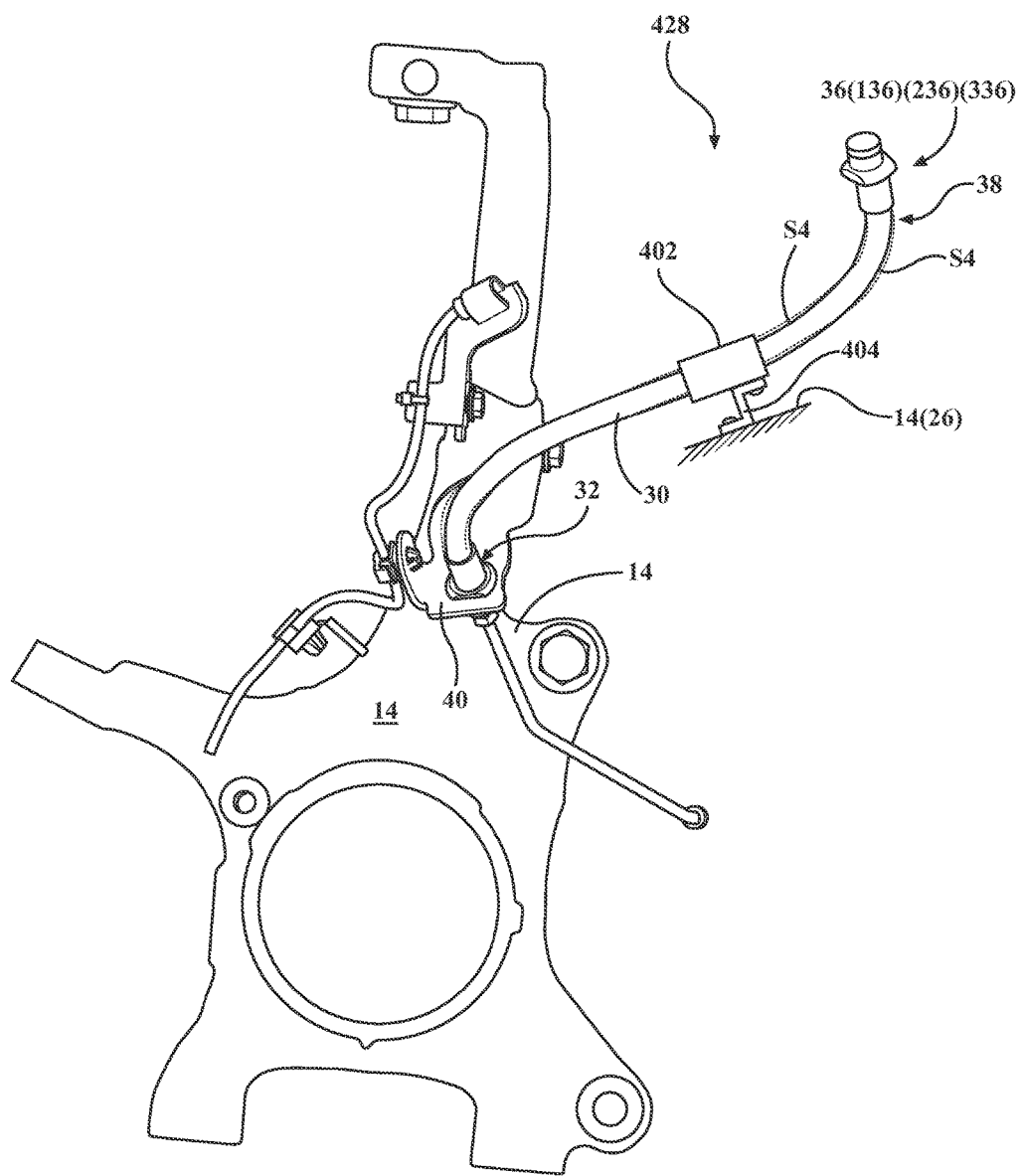
FIG. 8A is a perspective view illustrating a modified brake hose assembly having a fixed third connector.

With reference to FIG. 8A, an alterative brake hose assembly is generally illustrated at 428. The brake hose assembly 428 is similar to the brake hose assembly 28 except for the inclusion of a third connector 402. The third connector 402 is positioned on the flexible cylindrical member 30 between the first connector 32 and the second connector 36. The third connector 402 is fixedly secured to the flexible cylindrical member 30 similar to the first connector 32. The third connector 402 is connected to a vehicle body component such as the chassis 14, the steering knuckle 26 or a different vehicle body component from the chassis 14 or the steering knuckle 26.

The brake hose assembly 428 allows for the fixed length of the flexible cylindrical member 30 between the first connector 32 and the third connector 402. The brake hose assembly 428 further allows for the fixed orientation of the flexible cylindrical member 30 with respect to the first connector 32 and the third connector 402. As the brake hose assembly 428 includes the releasable second connector 36, including the second connectors 136, 26, and 336, the length of the flexible cylindrical member 30 between the third connector 402 and the second connector 36 can be varied. Further, the orientation of the flexible cylindrical member 30 between the third connector 402 and the second connector 36 can be varied, shown by dotted shape line S4.

Figure 8B:
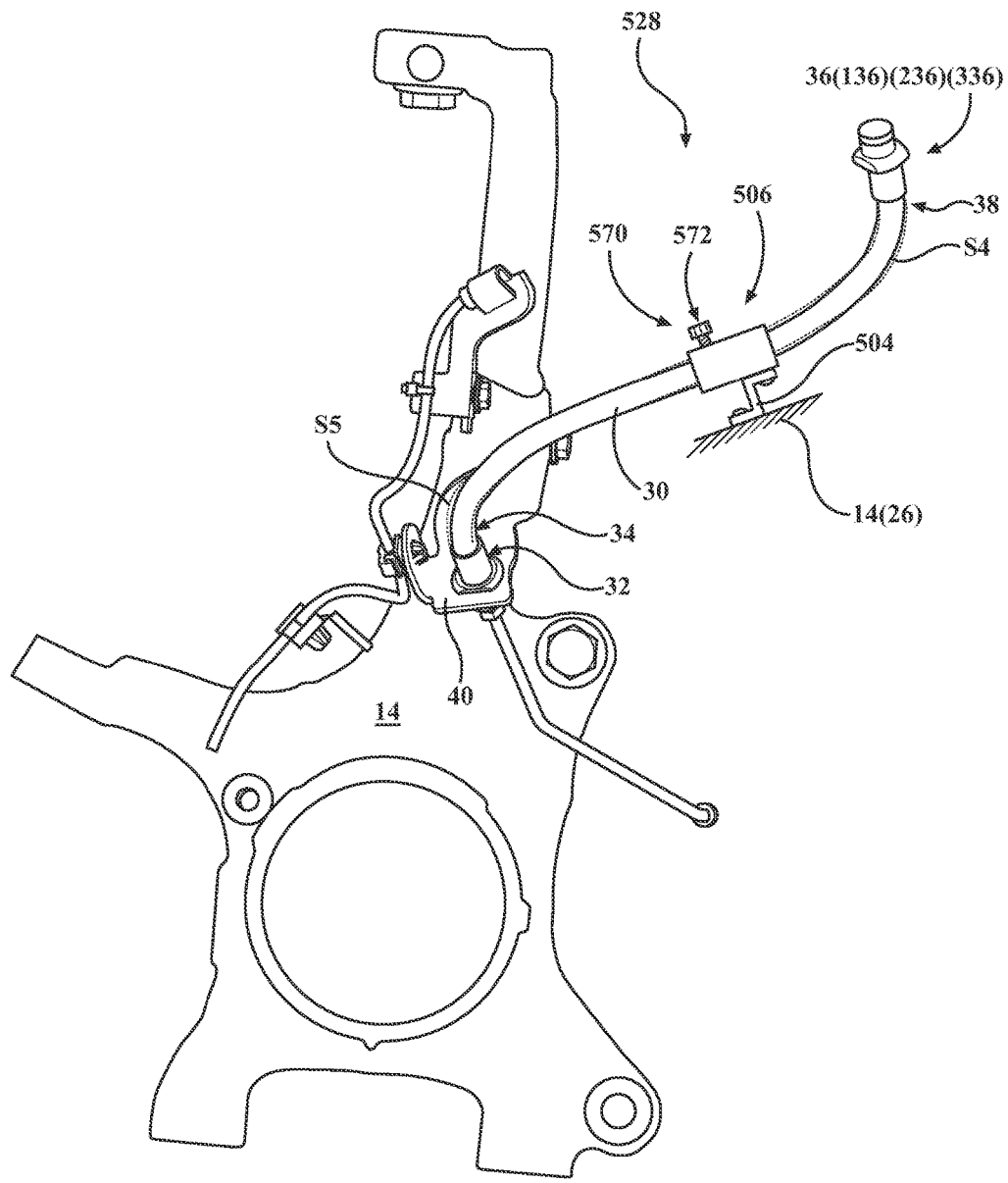
FIG. 8B is a perspective view of the modified brake hose assembly having a releasable third connector.

With reference to FIG. 8B, a further alterative brake hose assembly is generally illustrated at 528. The brake hose assembly 528 is similar to the brake hose assembly 28 except for the inclusion of a third connector 506. The third connector 506 is positioned on the flexible cylindrical member 30 between the first connector 32 and the second connector 36. The third connector 506 is releasably secured to the flexible cylindrical member 30 similar to the second connector 36, including second connectors 13, 236, and 336. Specifically, the third connector 506 has a securement member 570 corresponding to one of the securement members 70, 170, 270, and 370.

The third connector 506 is connected to a vehicle body component such as the chassis 14, the steering knuckle 26 or a different vehicle body component from the chassis 14 or the steering knuckle 26.

The brake hose assembly 528 allows for the variable length of the flexible cylindrical member 30 between the first connector 32 and the third connector 402. The brake hose assembly 528 further allows for the variable orientation of the flexible cylindrical member 30 with respect to the first connector 32 and the third connector 506, shown by dotted shape line S5.

As the brake hose assembly 528 includes the releasable second connector 36, including the second connectors 136, 26, and 336, the length of the flexible cylindrical member 30 between the third connector 506 and the second connector 36 can be varied. Further, the orientation of the flexible cylindrical member 30 between the third connector 506 and the second connector 36 can be varied, shown by dotted shape line S6.

Figure 9:
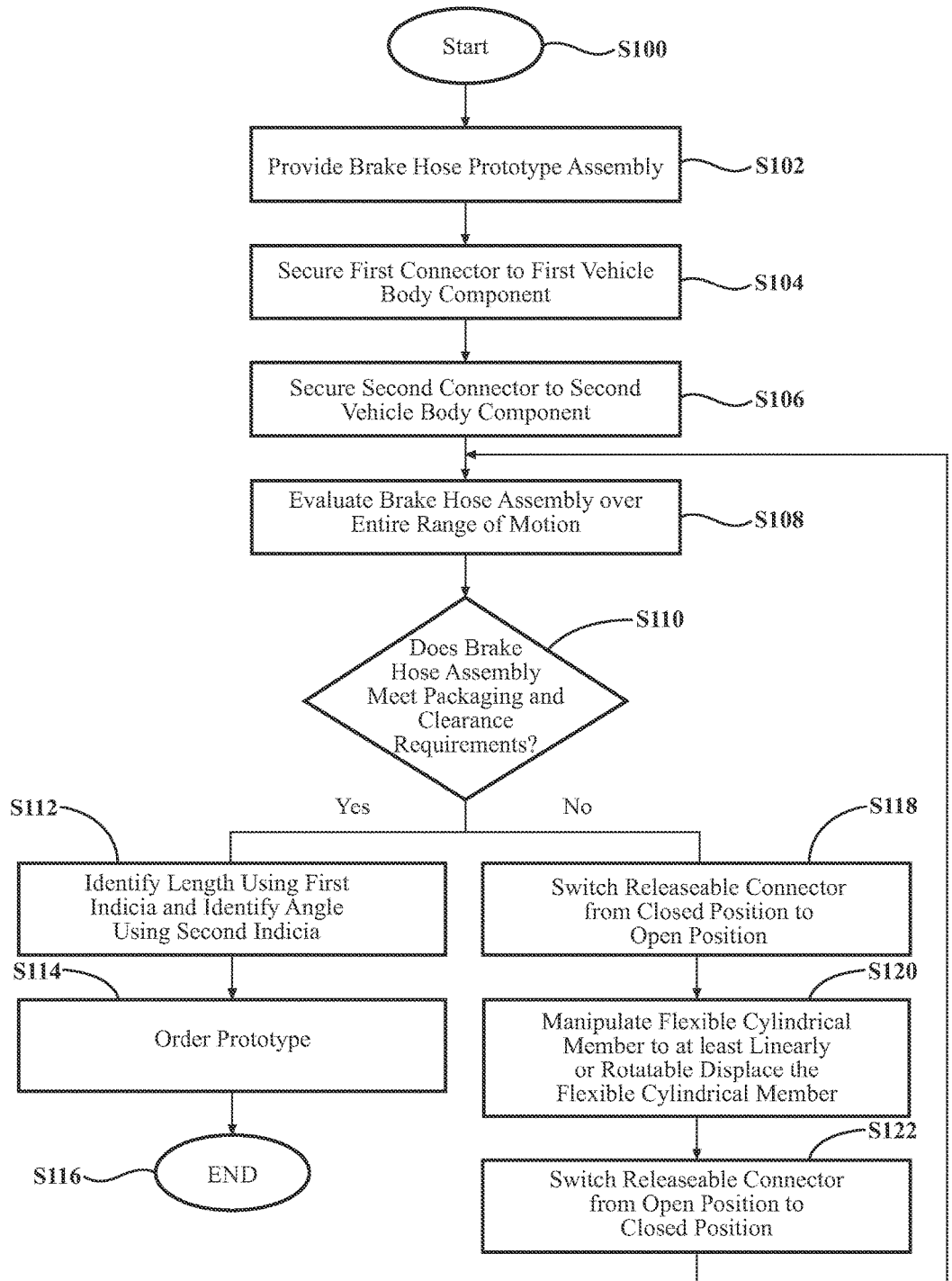
FIG. 9 is a flowchart delineating a method for prototyping a brake hose assembly.

In order to facilitate a better understanding of the device for prototyping a brake hose, a method for prototyping a brake hose will be described in relation to the flowchart illustrated in FIG. 9 in which the process starts at step S100.

In step S102, a prototype having the above structure of the brake hose assembly 28 is provided. It is appreciated, of course, that the brake hose assembly provided includes any one of the second connectors 36, 136, 236, and 336 having the respective securement members 70, 170, 270, and 370. Further, the brake hose assembly 28 optionally includes a third connector 402 or 506.

Next, in step S104, the first connector 32 is secured to the first vehicular body component. In step S106, the second connector is secured to the second vehicular body component.

The method then proceeds to step S108 in which the evaluation of the brake hose assembly is conducted. Specifically, the wheel 20 is displaced over the entire range of motion including the entire displacement of the suspension apparatus 10 and the entire range of steering of the wheel 20.

In step S110 it is determined whether the current configuration of the brake hose assembly 28 meets all required packaging and clearance requirements. If yes in step S110, the process proceeds to step S112 through step S116. On the other hand, if no in step S110, the process proceeds to step S118.

In step S118, the releasable connector is switched from the closed position to the open position. The releasable connector is at least one or both of the second connector and the third connector.

After switching the releasable connector from the closed position to the open position, the process proceeds to step S120. In step S120, the flexible cylindrical member is manipulated to displace the flexible cylindrical member at least in one or both of the linear and rotational directions. Then in step S122, the releasable connector is switched from the open position to the closed position.

The process proceeds back to step S108 to evaluate the current configuration of the brake hose assembly 28 the entire range of motion. The process repeats the steps of S108, S110, S118, S120, and S122 until an affirmative determination is made in step S108.

After an affirmative determination is made in step S108, the process proceeds to step S112 in which the length of the flexible cylindrical member is identified using the plurality of equally spaced first indicia 62 and the edge 68. The angle of the flexible cylindrical member with respect to the releasable second connector (36, 136, 236, 336, or 506) is identified using the plurality of equally spaced second indicia 64 and the datum 66.

Subsequently, in step S114, a brake hose assembly having the identified length from the plurality of equally spaced first indicia and the angled from the plurality of equally spaced second indicia is ordered. Upon ordering of the brake hose assembly prototype in step S114, the process ends in step S116.

It is appreciated, of course, that the device for prototyping the brake hose assembly and method thereof is not limited to such use with a brake hose for transmitting brake fluid and is operable in sizing Bowden cables and other assemblies capable of providing a flexible conduit connection between on two components in which one component is movable with respect to another in at least one or two dimensions.

Moreover, the device for prototyping the brake hose assembly and method thereof is not limited to use in conjunction with attachment to a chassis 14 and a drive wheel hub 24 and is operable on two components in which one component is movable with respect to another in at least one or two dimensions. Specifically, any two of the first connector, the second connector and the third connector can be provided on the same vehicle body component, with the other connector provided on a different vehicle body component.

It is appreciated, of course, that the brake hose assembly may optionally include more than three connectors. Further, the brake hose assembly may optionally further include an additional cover or protector that is provided over the flexible cylindrical member. The cover could optionally include a weighted object to simulate the accumulation of snow, dirt or other debris.

From the foregoing it can be seen that the present invention provides a device for prototyping of a conduit or brake hose prototype assembly having a first connector fixedly connected to a first end portion of a brake hose and a second connector that is releasably connected to a second end portion to allow for linear and rotatable displacement of the flexible hose with respect to the second connector when the second connector is switched into an open position so as to allow for various lengths and angled orientations to determine a length and angled orientation that provides the packaging and clearance requirements. Having described the invention, however, many modifications thereto will become apparent to those of skill in the art without deviation from the spirit of the invention as defined by the scope of the appended claims.

It is claimed:

1. A device for prototyping a conduit between a first vehicular component and a second vehicular component, said device comprising:
a flexible cylindrical member having a first end portion and an opposite second end portion, the cylindrical member having a plurality of equally spaced first indicia extending longitudinal in a first direction on an outer surface of the cylindrical member and a plurality of equally spaced second indicia extending circumferentially in a second direction on the outer surface of the cylinder member, the first direction extending generally normal to the second direction;
a first connector fixedly connected to the first end portion of the cylindrical member, the first connector connected to the first vehicular body component; and
a second connector positionable between a closed position in which the second end portion is releasably connected to the second connector and an open position in which the second end portion is rotatable and linearly displaceable with respect to the second connector, the plurality of equally spaced first indicia and the plurality of equally spaced second indicia are configured to facilitate evaluation of the rotational and linear displacement of the second end of the flexible cylindrical member, the second connector connected to the second vehicular body component.

2. The device according to claim 1, wherein said second connector includes a securement member that positions the second connector in the closed position or the open position, the securement member frictionally engages the flexible cylindrical member to the second connector in the closed position to prevent relative movement between the flexible cylindrical member and the second connector.

3. The device according to claim 2, wherein the securement member is a clamp.

4. The device according to claim 2, wherein the second connector is a circular collar and the securement member is a fastener that engages with an internally threaded aperture formed in the circular collar.

5. The device according to claim 1, wherein said second connector includes a securement member that positions the second connector in the closed position or the open position, the securement member pierces the outer surface of the flexible cylindrical member in the closed position to prevent relative movement between the flexible cylindrical member and the second connector.

6. The device according to claim 5, wherein the securement member is a pin, and wherein the second connector is formed with an aperture formed, in the closed position the pin is received within the aperture and pierces the outer surface of the flexible member.

7. The device according to claim 5, wherein the second member is formed as a cylindrical collar positioned around the outer surface of the flexible member, the cylindrical collar having a slot at least partially bisecting the collar in a longitudinal direction thereof,
wherein the securement member is formed as a plurality of teeth extending radially inward from an inner surface of the collar.

8. The device according to claim 1 further comprising:
a third connector positioned on the flexible cylindrical member between the first connector end and the second connector, the third connected to the a third vehicular body component, the third connector is fixedly connected to the flexible cylindrical member between the first end portion and the second end portion.

9. The device according to claim 1 further comprising:
a third connector positioned on the flexible cylindrical member between the first connector end and the second connector, the third connected to the a third vehicular body component, the third connector is positionable between a closed position in which a portion of the flexible cylindrical member is releasably connected to the third connector and an open position in which the flexible cylindrical member is rotatable and linearly displaceable with respect to the third connector.

10. A brake hose prototype assembly adapted for determining a suitable length of a brake hose between a first vehicular body component and a second vehicular body component, and adapted for determining an orientation of the brake hose relative to the second vehicular body component, said brake hose prototype assembly comprising:
a flexible cylindrical member having a first end portion and an opposite second end portion, the cylindrical member having a plurality of equally spaced first indicia extending longitudinal in a first direction on an outer surface of the cylindrical member and a plurality of equally spaced second indicia extending circumferentially in a second direction on the outer surface of the cylinder member, the first direction extending generally normal to the second direction;
a first connector fixedly connected to the first end portion of the cylindrical member, the first connector connected to the first vehicular body component; and
a second connector positionable between a closed position in which the second end portion is releasably connected to the second connector and an open position in which the second end portion is rotatable and linearly displaceable with respect to the second connector, the plurality of equally spaced first indicia and the plurality of equally spaced second indicia are configured to facilitate evaluation of the rotational and linear displacement of the second end of the flexible cylindrical member, the second connector connected to the second vehicular body component.

11. The brake hose prototype assembly according to claim 10, wherein said second connector includes a securement member that positions the second connector in the closed position or the open position, the securement member frictionally engages the flexible cylindrical member to the second connector in the closed position to prevent relative movement between the flexible cylindrical member and the second connector.

12. The brake hose prototype assembly according to claim 11, wherein the securement member is a clamp.

13. The brake hose prototype assembly according to claim 12, wherein second connector is a circular collar the securement member is a fastener that engages with an internally threaded aperture formed in the circular collar.

14. The brake hose prototype assembly according to claim 10, wherein said second connector includes a securement member that positions the second connector in the closed position or the open position, the securement member pierces the outer surface of the flexible cylindrical member in the closed position to prevent relative movement between the flexible cylindrical member and the second connector.

15. The brake hose prototype assembly according to claim 14, wherein the securement member is a pin, and wherein the second connector is formed with an aperture formed, in the closed position the pin is received within the aperture and pierces the outer surface of the flexible member.

16. The brake hose prototype assembly according to claim 14, wherein the second member is formed as a cylindrical collar positioned around the outer surface of the flexible member, the cylindrical collar having a slot at least partially bisecting the collar in a longitudinal direction thereof,
wherein the securement member is formed as a plurality of teeth extending radially inward from an inner surface of the collar.

17. The brake hose prototype assembly according to claim 10 further comprising:
a third connector positioned on the flexible cylindrical member between the first connector end and the second connector, the third connected to the a third vehicular body component, the third connector is fixedly connected to the flexible cylindrical member between the first end portion and the second end portion.

18. The brake hose prototype assembly according to claim 1 further comprising:
a third connector positioned on the flexible cylindrical member between the first connector end and the second connector, the third connected to the a third vehicular body component, the third connector is positionable between a closed position in which a portion of the flexible cylindrical member is releasably connected to the third connector and an open position in which the flexible cylindrical member is rotatable and linearly displaceable with respect to the third connector.

19. A method for prototyping a brake hose assembly to determine a suitable length of a brake hose between a first vehicular body component and a second vehicular body component, and adapted for determining an orientation of the brake hose relative to the second vehicular body component, the brake hose assembly having:
a flexible cylindrical member having a first end portion and an opposite second end portion, the cylindrical member having a plurality of equally spaced first indicia extending longitudinal in a first direction on an outer surface of the cylindrical member and a plurality of equally spaced second indicia extending circumferentially in a second direction on the outer surface of the cylinder member, the first direction extending generally normal to the second direction,
a first connector fixedly connected to the first end portion of the cylindrical member, and
a second connector connected to the second vehicular body component, the second connector positionable between a closed position in which the second end portion is releasably connected to the second connector and an open position in which the second end portion is rotatable and linearly displaceable with respect to the second connector, the plurality of equally spaced first indicia and the plurality of equally spaced second indicia are configured to facilitate evaluation of the rotational and linear displacement of the second end of the flexible cylindrical member, said method comprising:

connecting the first connector to the first vehicular body component;

connecting the second connector to the second vehicular body component;

moving the second connector from the closed position to the open position;

manipulating the second end portion of the flexible cylindrical member to displace the flexible cylinder member at least linearly or rotationally with respect to the second connector; and identifying one of the plurality of first indicia corresponding to a length of the flexible cylindrical member between the first vehicular body component and the second vehicular body component or identifying one of the plurality of second indicia corresponding to an angle of the flexible cylindrical member with respect to the second connector.

20. The method according to claim 19, wherein at least one of the first vehicular body component and the second vehicular body component is in a linearly and rotationally moveable with respect to the other of the first vehicular body component and the second vehicular body component over a defined range of motion, and wherein the second end portion of the flexible cylindrical member is manipulated such that the flexible cylindrical member is capable of maintaining connection of the first connector to the first vehicular body component and the second connector to the second vehicular body component over the entire defined range of motion.

* * * * *